United States Patent [19]
Anegawa

[11] Patent Number: 4,978,840
[45] Date of Patent: Dec. 18, 1990

[54] IC CARD HAVING ENERGY INPUT AND DATA EXCHANGE ELEMENTS ON OPPOSITE SIDES THEREOF

[75] Inventor: Takao Anegawa, Kitakyusyu, Japan

[73] Assignee: Kabushiki Kaisha Toshiba, Kawasaki, Japan

[21] Appl. No.: 149,598

[22] Filed: Jan. 28, 1988

[30] Foreign Application Priority Data

Jan. 28, 1987 [JP] Japan .................................. 62-16253

[51] Int. Cl.$^5$ ............................................. G06K 19/06
[52] U.S. Cl. ..................................... 235/492; 235/454; 235/491
[58] Field of Search ................ 235/380, 454, 492, 491

[56] References Cited

U.S. PATENT DOCUMENTS

| | | | |
|---|---|---|---|
| 4,007,355 | 2/1977 | Moreno | 235/492 X |
| 4,575,621 | 3/1986 | Dreifus | 235/380 |
| 4,792,910 | 12/1988 | Lange | 235/454 X |

Primary Examiner—David Trafton
Attorney, Agent, or Firm—Foley & Lardner, Schwartz, Jeffery, Schwaab, Mack, Blumenthal & Evans

[57] ABSTRACT

An IC card is constructed for receiving external energy and transmitting and receiving data to and from an external data read/write unit with no contact between them. One main surface of the IC card is provided with a power generating element for externally receiving energy to generate power, and the other main surface of the IC card with semicondcutor elements for transmitting and receiving energy of data information.

The IC card uses semiconductor photoelements to drive the IC card and the external data read/write unit with no mechanical contact between them. They will realize, therefore, a small and lightweight communication system at a low cost by using conventional parts and structures to perfectly prevent data communication energy and power supplying energy from interfering with each other, thereby preventing an erroneous operation of the IC card and improving reliability thereof.

13 Claims, 4 Drawing Sheets

IC CARD HAVING ENERGY INPUT AND DATA EXCHANGE ELEMENTS ON OPPOSITE SIDES THEREOF

BACKGROUND OF THE INVENTION

1. Field of the Invention

The present invention relates to an IC card for receiving external energy and transmitting and receiving data to and from an external unit with no contact between them, and particularly to an IC card which can prevent erroneous operations in receiving energy and transmitting and receiving data.

2. Description of the Prior Art

FIG. 1 is a view generally showing functions of a light communication system using an IC card.

The light communication system comprises an IC card 101 and a data read/write unit 111 for reading and writing data from and to the IC card 101 inserted into the unit 111. The data read/write unit 111 is connected to a host computer 121 through data lines 112. When the IC card 101 is placed in the data read/write unit 111, data are read out of and written into the IC card 101 by the data read/write unit 111 with light energy with no contact between the IC card 101 and the unit 111.

The data read/write unit 111 comprises a data manipulating portion 113 for storing, processing, writing and reading data, connected to the host computer 121 through the data lines 112; a power supplying portion 114; a light emitting element 116 for transmitting data; and a light receiving element 117 for receiving data. The power supplying portion 114 and the elements 116 and 117 are separately connected to the data manipulating portion 113. The power supplying portion 114 is connected to an ultraviolet lamp 115 which is a light energy radiator facing a solar battery element 102 which is a power generating and supplying element of the IC card 101. When the IC card 101 is inserted into the data read/write unit 111, the light emitting element 116 of the unit 111 faces a light receiving element 103 which is a data receiving element of the IC card 101, and the light receiving element 117 of the unit 111 facing a light emitting element 104 which is a data transmitting element of the IC card 101.

The solar battery element 102 of the IC card 101 generates power when receiving light energy from the ultraviolet lamp 115 of the data read/write unit 111 to drive the IC card 101. The light receiving element 103 of the IC card 101 receives data from the light emitting element 116 of the unit 111, while the light emitting element 104 of the IC card 101 transmits data to the light receiving element 117 of the unit 111. For the light emitting elements and light receiving elements, there are used light emitting diodes and light receiving diodes. The host computer 121 stores information to be communicated. If the amount of information is not so large, the function of the host computer 121 may be carried out by the data manipulating portion 113.

FIG. 3 is a cross-sectional view showing the IC card 101 of the prior art. The power generating element 102, the light receiving element 103 and the light emitting element 104 are disposed on one main surface (a front surface) 118 of the IC card 101 to face the ultraviolet lamp 115, the light emitting element 116 and the light receiving element 117 of the data read/write unit 111. These elements 102, 103 and 104 of the IC card 101 are electrically connected to a data manipulating element (an IC) 105 for storing, processing, writing and reading data, incorporated in the IC card 101.

FIG. 2 is a cross-sectional view showing the IC card light communication system with the IC card 101 being inserted. Under this condition, the power generating element 102, the light receiving element 103 and the light emitting element 104 arranged side by side on the one main surface 118 of the IC card 101 face the ultraviolet lamp 115, the light emitting element 116 and the light receiving element 117 of the data read/write unit 111, respectively.

Meanwhile, to drive an IC card and an external data read/write unit for reading and writing data from and to the IC card with no contact between them, there have been proposed various systems such as a system using radio waves and a system using light as mentioned in the above. The system using radio waves requires complicated circuits for transmitting and receiving data that is disadvantageous to the IC card which shall be small and lightweight. On the other hand, the method using light can be materialized with semiconductors which are inexpensive and with semiconductor pellets themselves to reduce the size and weight of the system. Therefore, IC cards using light are widely used.

To drive the IC card and the data read/write unit with no contact between them, two kinds of semiconductor elements are indispensable, one for supplying power and one for data communications. According to the IC card light communication system of the prior art mentioned in the above, two kinds of the semiconductor elements each having different function are disposed side by side on one main surface of the IC card such that part of the semiconductor elements is exposed. Since signals given for the semiconductor elements are of light energy for both the functions of the elements, the signals may interfere with each other to cause the elements to receive erroneous signals, thereby causing an erroneous operation of the IC card and seriously deteriorating reliability of the system as a whole. In addition, some of the semiconductor photoelements require special filters to be coated over the surfaces thereof to prevent this effect of light energy.

SUMMARY OF THE INVENTION

An object of the present invention is to provide an IC card light communication system which is able to prevent an IC card from operating erroneously.

Another object of the present invention is to provide an IC card which can prevent the reception of erroneous signals in communicating with an external unit.

In order to accomplish the objects, the present invention provides an IC card for receiving external energy and transmitting and receiving data to and from an external data read/write unit with no contact between them. One main surface of the IC card is provided with a power generating element for externally receiving energy and generating power, and the other main surface of the IC card with semiconductor elements for transmitting and receiving energy of data information.

The IC card according to the present invention uses semiconductor photoelements to drive the IC card and the external data read/write unit with no mechanical contact between them. The system of the present invention will be, therefore, small and light and realized at a low cost by using conventional parts and structures to perfectly prevent data communication energy and power supplying energy from interfering with each other, thereby preventing an erroneous operation of the IC card and improving reliability thereof.

BRIEF DESCRIPTION OF THE DRAWINGS

These and other objects, features and advantages of the present invention will become apparent from the following description of preferred embodiment taken in conjunction with the accompanying drawings in which.

DETAILED DESCRIPTION OF THE PREFERRED EMBODIMENTS

Figure 1:
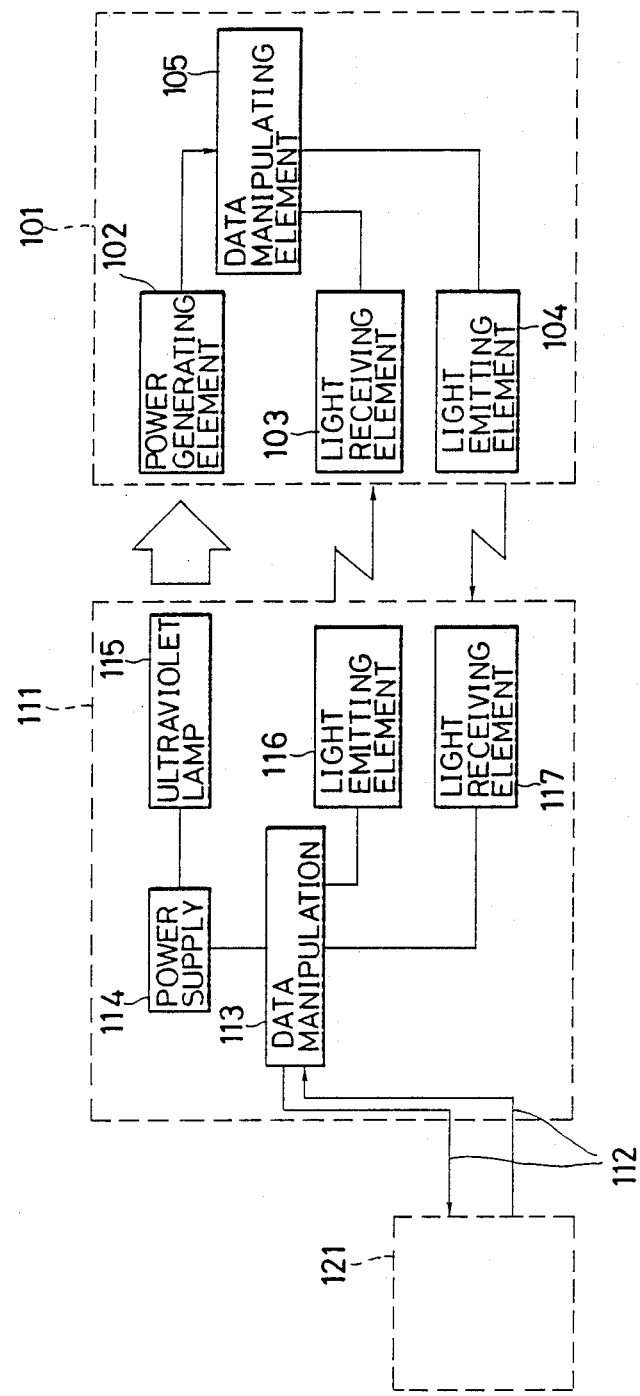
FIG. 1 is a block diagram showing an overall function of an IC card light communication system.
Figure 2:
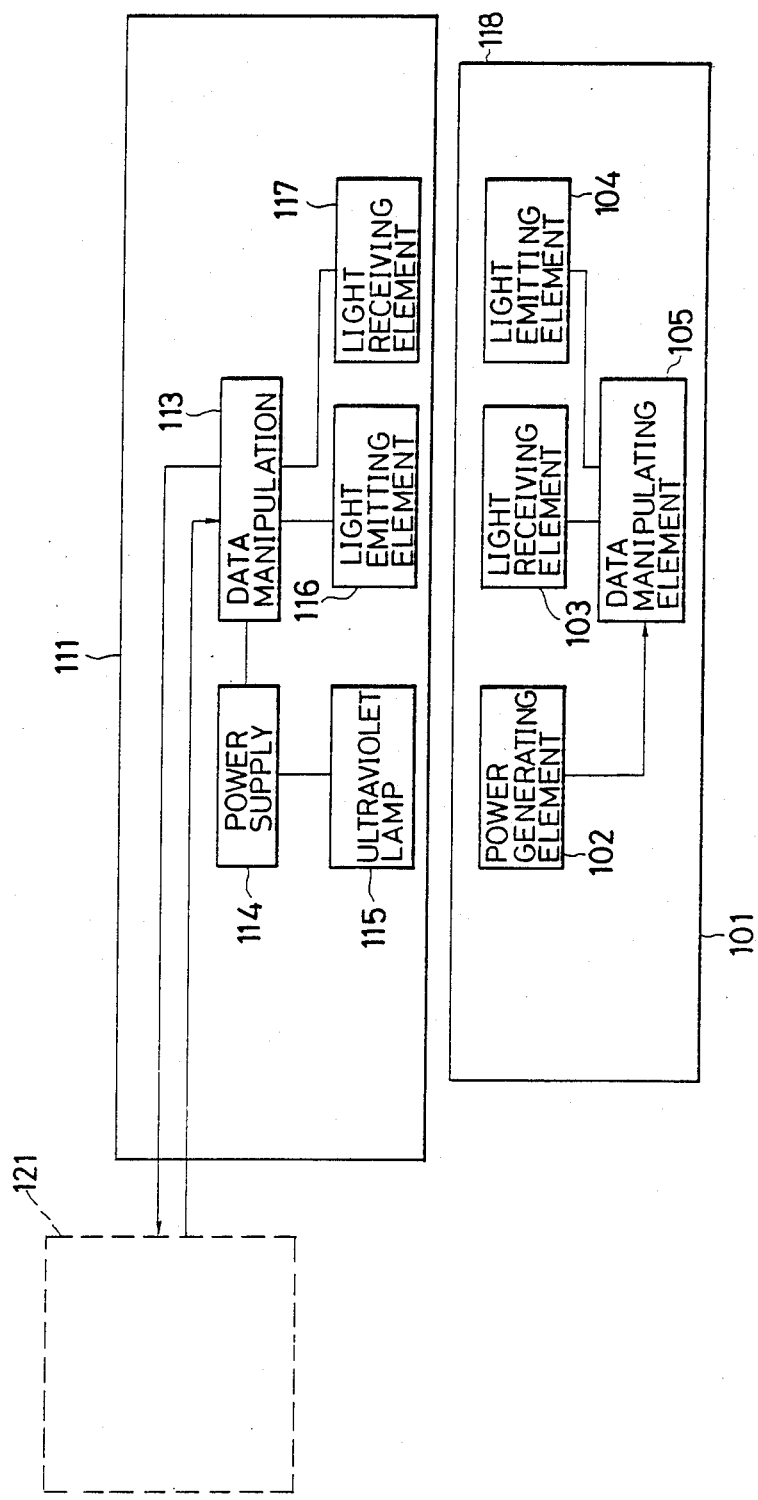
FIG. 2 is a block diagram showing the constitution of a light communication system with an IC card inserted, according to a prior art.
Figure 3:
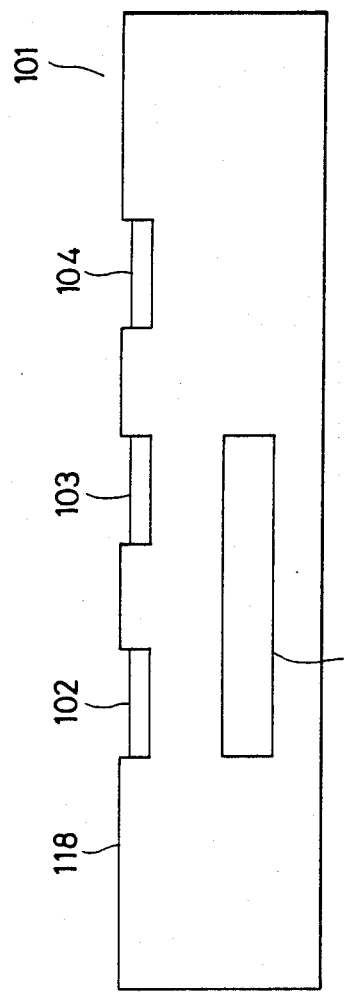
FIG. 3 is a cross-sectional view schematically showing the IC card of the system shown in FIG. 2.
Figure 4:
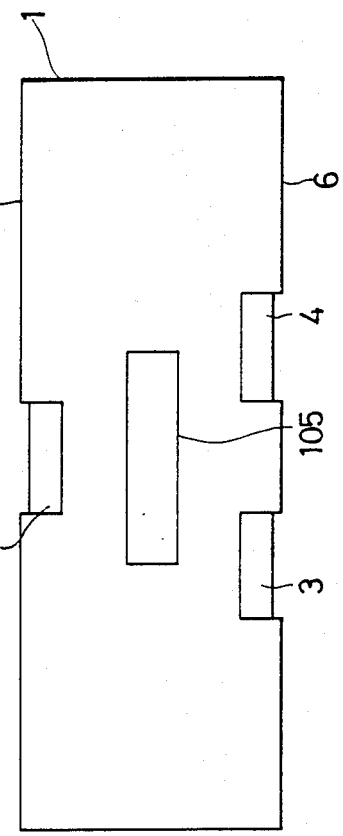
FIG. 4 is a cross-sectional view schematically showing an IC card according to the present invention.

Referring to FIG. 4, there is shown a thin type IC card according to the present invention. One main surface (a front surface) 5 is provided with a solar battery element 2 which is a power generating element, and the other main surface (a reverse surface) 6 is provided with a light emitting element 3 and a light receiving element 4.

Figure 5:
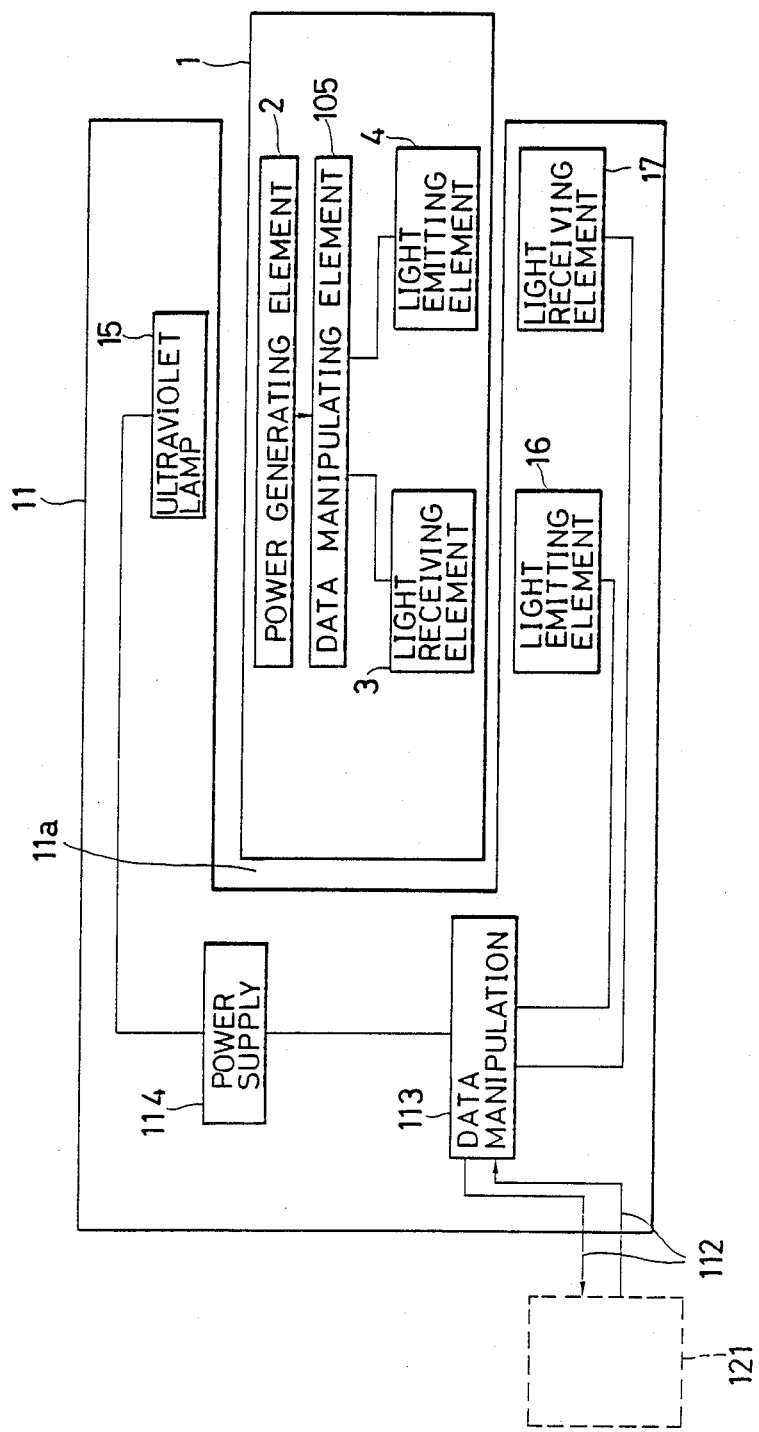
FIG. 5 is a block diagram showing the constitution of an IC card light communication system according to the present invention with the IC card of FIG. 4 inserted.

As shown in FIG. 5, the IC card 1 is inserted into a slit-like recess 11a of a data read/write unit 11 for reading and writing data from and to the IC card 1. In the recess 11a at a location facing the power generating element 2 on the main surface 5 of the IC card 1 to be inserted thereto, there is disposed an ultraviolet lamp 15, while at locations facing the light receiving element 3 and the light emitting element 4 on the other main surface 6 of the IC card 1, there are disposed a light emitting element 16 and a light receiving element 17 respectively. In the IC card 1, the power generating element 2, the light emitting element 3 and the light receiving element 4 are electrically connected to a data manipulating element 105 for storing, processing, writing and reading data.

Thus, the ultraviolet lamp 15 faces the solar battery element (power generating element) 2, the light emitting element 16 facing the light receiving element 3 and the light receiving element 17 facing the light emitting element 4 so that light energy is transferred between the data read/write unit 11 and the IC card 1 as in the case of the prior art, but what differs from the prior art is that the solar battery element 2 is disposed on a surface where no light receiving and emitting elements exist.

According to the present invention, the power generating element 2 is disposed on the one main surface 5 while the light receiving element 3 and the light emitting element 4 on the other main surface 6 so that, compared to the prior art system in which the three elements are disposed solely on one main surface thereof, data communication signals and power supplying energy are prevented from interfering with each other, and both sides of the IC card can effectively be used to reduce the size and weight of the IC card.

In summary, the present invention uses various semiconductor photodevices to realize an IC card and an external data read/write unit for reading and writing data from and to the IC card, and operates them with no mechanical contact between them. In addition, the system according to the present invention uses inexpensive semiconductor photoelements which are widely available to easily achieve the compactness and lightness of the system. Without adding new functions and parts and with conventional component elements, the present invention can completely prevent data communication and power energy from interfering with each other as well as preventing an erroneous operation of the IC card to improve reliability thereof.

Various modifications will become possible for those skilled in the art after receiving the teachings of the present disclosure without departing from the scope thereof.

What is claimed is:

1. An IC card for receiving external energy and transmitting and receiving data to and from an external data read/write unit with external energy, comprising:
   a first main surface having a power generating element for receiving external energy to generate power; and
   a second main surface having data communication elements for transmitting and receiving data energy.

2. The IC card as claimed in claim 1, wherein the external data read/write unit comprises:
   an energy radiator disposed at a location facing said first main surface of said IC card to supply energy to the power generating element of said IC card; and
   data communication elements disposed at locations facing said second main surface of said IC card to transmit and receive data energy to and from the data communication elements of said IC card.

3. The IC card as claimed in claim 2, wherein the energy is light energy.

4. The IC card as claimed in claim 3, wherein the data communication elements of said IC card comprise a light emitting element and a light receiving element.

5. The IC card as claimed in claim 4, wherein the data communication elements of the external data read/write unit comprise a light emitting element and a light receiving element.

6. The IC card as claimed in claim 2, wherein the energy radiator of the external data read/write unit comprises an ultraviolet lamp.

7. The IC card as claimed in claim 1, wherein said IC card is a thin type IC card, and said first main surface is a front surface and said second main surface being a reverse surface of said IC card.

8. An IC card communication system, comprising:
   (a) an IC card having,
      a power generating element for receiving external energy to generate power, said power generating element being disposed on a first main surface of said IC card; and
      data communication elements for transmitting and receiving data energy, said data communication elements being disposed on a second main surface of said IC card, and
   (b) a data read/write unit for reading and writing data from and to said IC card, having,
      an energy radiator disposed at a location facing the first main surface of said IC card to supply energy to the power generating element of said IC card, and data communication elements disposed at locations facing the second main surface of said IC card to transmit and receive data energy to and from the data communication elements of said IC card.

9. The IC card communication system as claimed in claim 8, wherein the energy is light energy.

10. The IC card communication system as claimed in claim 9, wherein the data communication elements of said IC card comprise a light emitting element and a light receiving element.

11. The IC card communication system as claimed in claim 10, wherein the data communication elements of the data read/write unit comprise a light emitting element and a light receiving element.

12. The IC card communication system as claimed in claim 8, wherein said energy radiator of the data read/write unit comprises an ultraviolet lamp.

13. An information exchange system comprising:
an IC card having a light emitting device and a photosensitive device on a first surface and a photocell on a second surface opposite to said first surface; and
a data reading and writing device having a slot into which said IC card is inserted to exchange data therebetween and having a light emitting device and a photosensitive device in correspondence with said light emitting device and said photosensitive device of the IC card and an optical energy source in correspondence with said photocell of the IC card, whereby said light emitting device and said photosensitive device of the data reading and writing device are isolated by the IC card itself when inserted into said slot.

* * * * *